No. 863,962. PATENTED AUG. 20, 1907.
A. B. AMES & H. SCHWENDENER.
COTTON PICKING OR HARVESTING MACHINE.
APPLICATION FILED JULY 17, 1906.

3 SHEETS—SHEET 2.

WITNESSES
INVENTORS
ALFRED B. AMES
HENRY SCHWENDENER
BY
ATTORNEYS

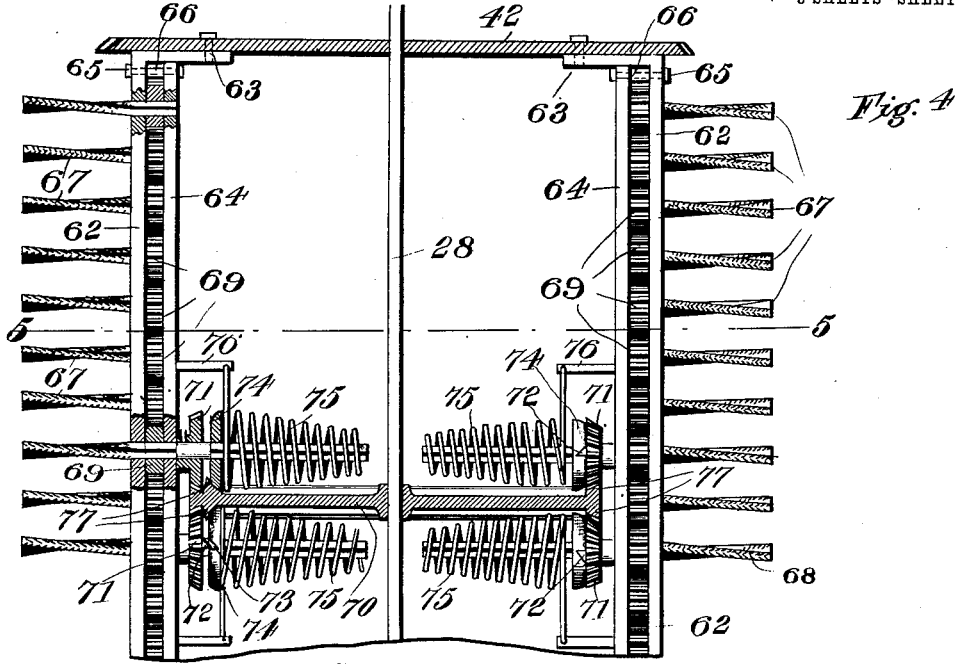
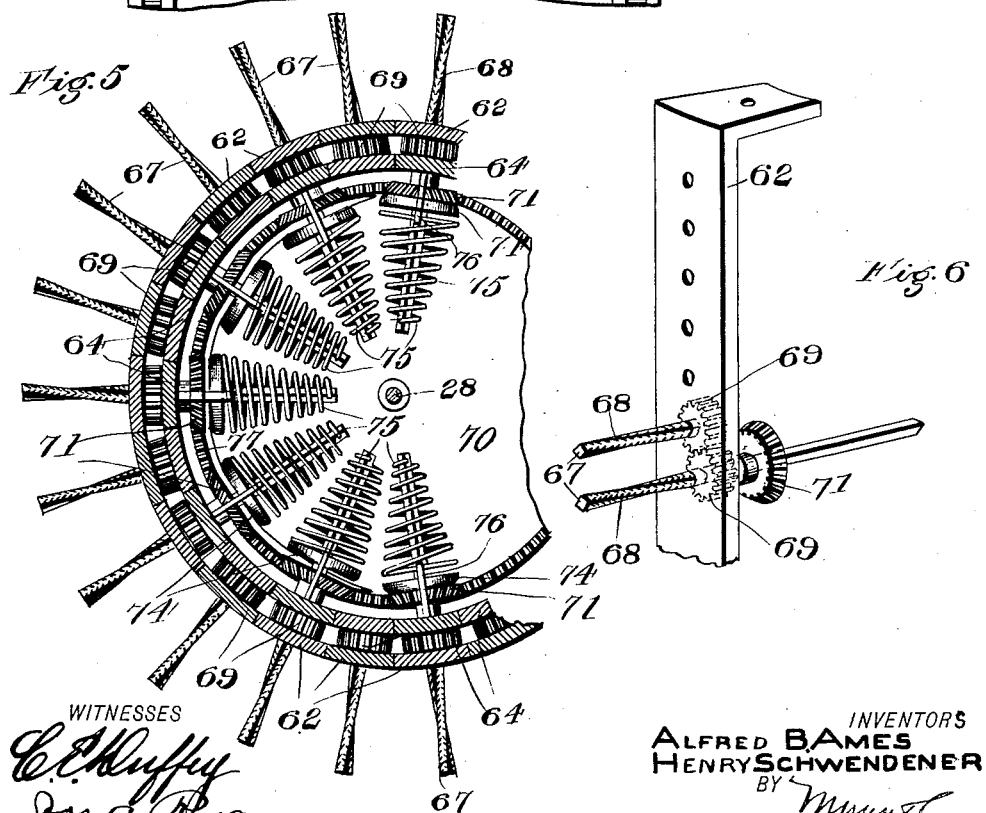
No. 863,962. PATENTED AUG. 20, 1907.
A. B. AMES & H. SCHWENDENER.
COTTON PICKING OR HARVESTING MACHINE.
APPLICATION FILED JULY 17, 1906.
3 SHEETS—SHEET 3.
INVENTORS
ALFRED B. AMES
HENRY SCHWENDENER

UNITED STATES PATENT OFFICE.

ALFRED B. AMES AND HENRY SCHWENDENER, OF WATONGA, OKLAHOMA TERRITORY.

COTTON PICKING OR HARVESTING MACHINE.

No. 863,962.      Specification of Letters Patent.      Patented Aug. 20, 1907.

Application filed July 17, 1906. Serial No. 326,606.

*To all whom it may concern:*

Be it known that we, ALFRED B. AMES and HENRY SCHWENDENER, citizens of the United States, residing at Watonga, in the county of Blaine, Territory of Oklahoma, have invented a new and useful Improvement in Cotton Picking or Harvesting Machines, of which the following is a specification.

This invention is a cotton picking or harvesting machine designed to pick cotton from plants in the field, having, necessarily, the practically essential feature that it will pick only ripe or open bolls, without injuring the unmatured portion of the crop.

The general plan of the machine is that of a straddle row harvester, in which the animals of the draft team go on opposite sides of the row and the plants pass through the machine and between a pair of cylinders provided with picking devices which gather the matured cotton, which, in turn, is doffed by brushes from the picking spindles and delivered to elevators which convey it to bags carried on the machine, which bags can be unloaded or removed at the ends of the row or otherwise. One man, only, riding on the machine, can drive the team and govern the operation.

Novelty of construction and effectiveness of operation will be particularly apparent with respect to the picking cylinders and the spindles carried thereby. As stated, the plants pass between the cylinders, which pick the cotton, respectively, from opposite sides of the row, both cylinders working on one row.

The invention is illustrated in the accompanying drawings, in which

Figure 1:
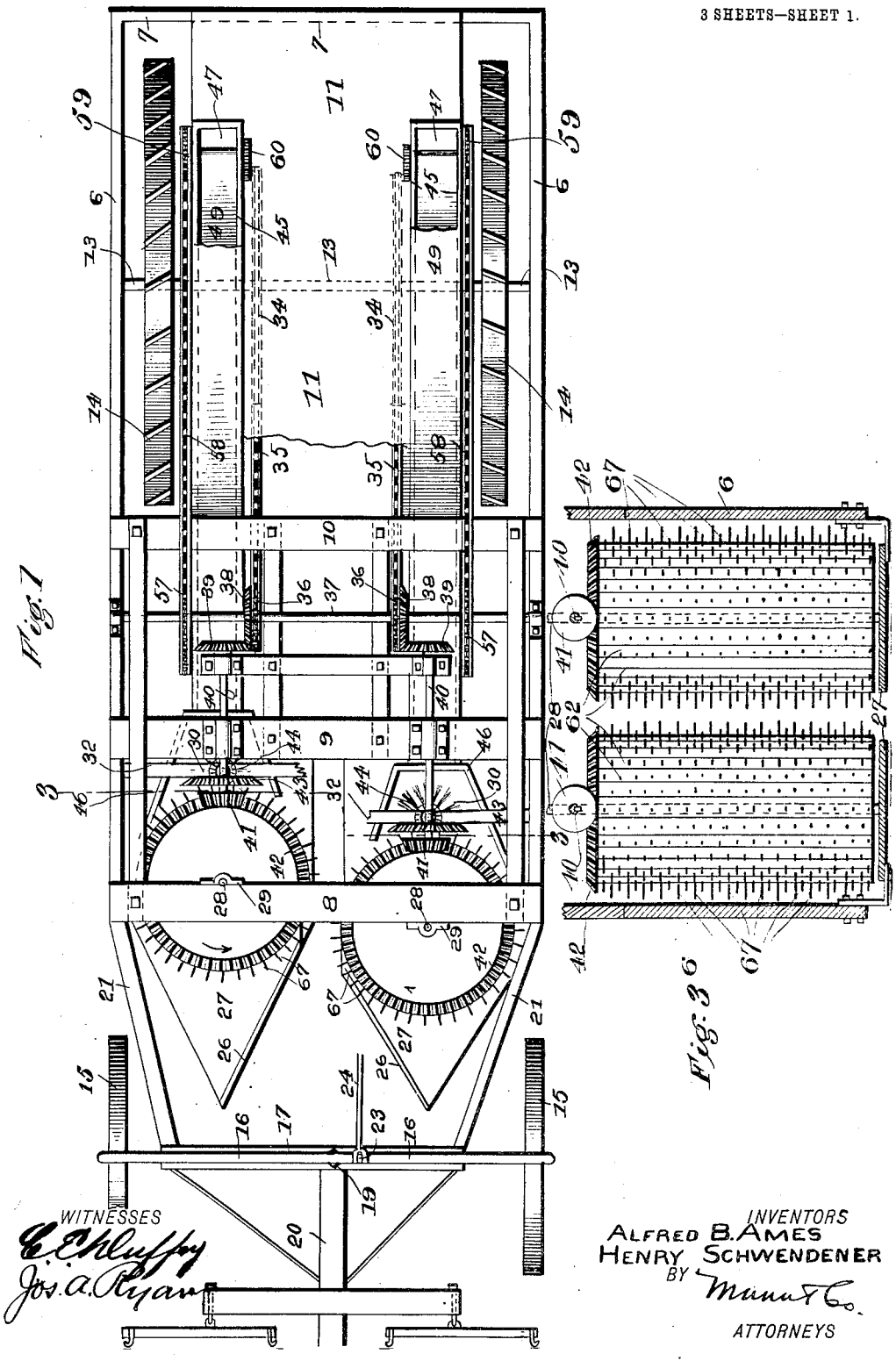
Figure 2:
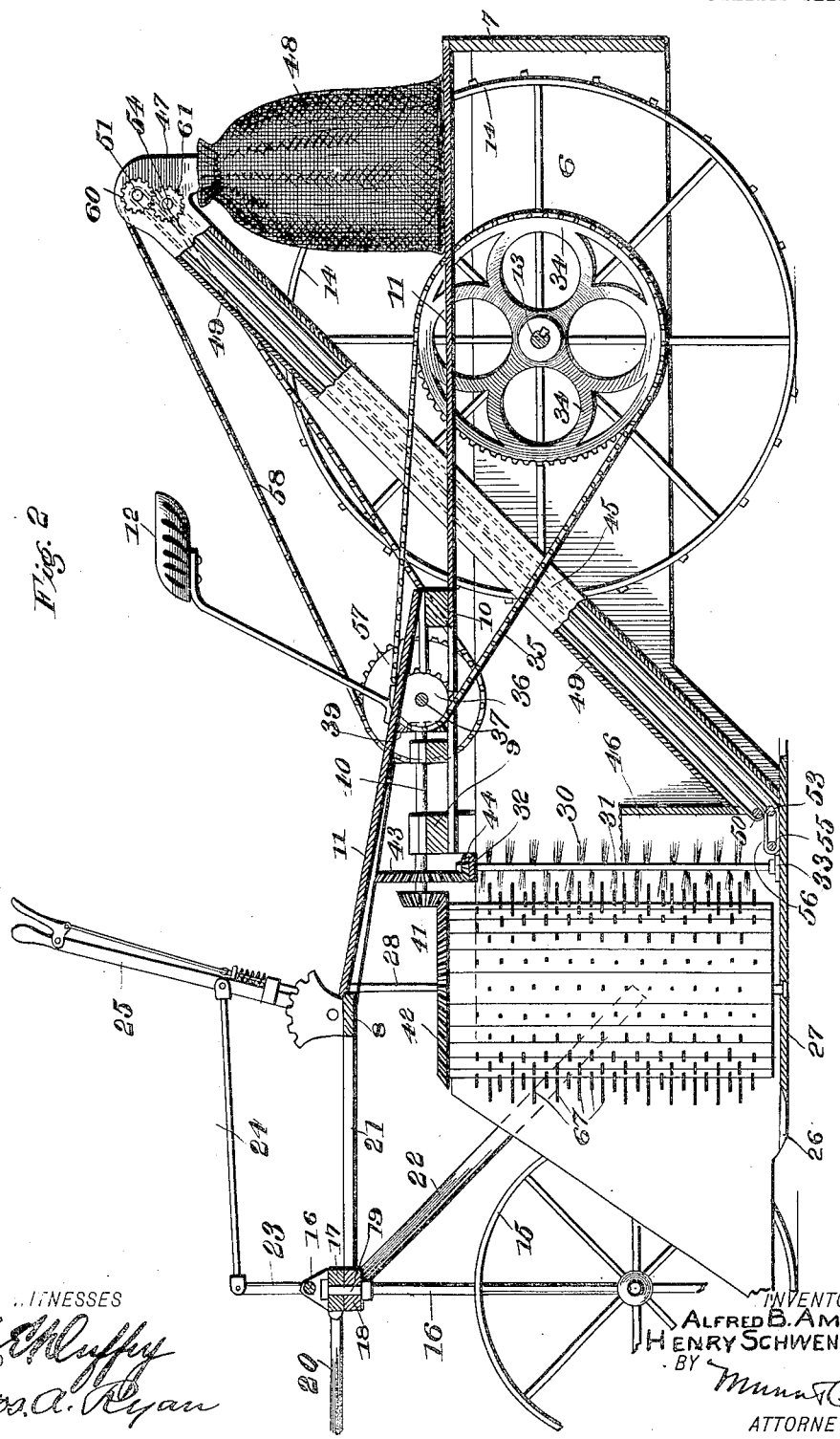

Figure 1 is a plan view of the machine, parts being broken away to show other parts clearly. Fig. 2 is a central vertical longitudinal section. Fig. 3 is a cross section on line 3—3 of Fig. 1, showing the picking cylinders in elevation. Fig. 4 is a central vertical section of one of the cylinders. Fig. 5 is a horizontal section on line 5—5 of Fig. 4. Fig. 6 is a detail in perspective of one of the spindle carrying bars which go to make up the cylinder.

The main frame of the machine is of proper construction to support the operative parts of the machine as hereinafter described, having particularly side pieces 6 connected at the rear end by a cross piece 7 and at the front end by a cross piece 8, and intermediate cross pieces 9 and 10, on which frame is mounted the platform 11 and seat 12. The frame is mounted upon the axle 13 of the driving wheels 14, the axle and interior parts of the frame being of sufficient height to pass over the tops of the plants.

The front truck consists of the wheels 15 and arched axle 16, which latter is mounted to swing upon a bolster 17 which rests upon a cross piece 18 thereunder, with a king bolt at 19. The tongue 20 is connected to the bolster, and the cross bar 18 is connected to the rear frame by side bars 21, and braces 22 which join the side frames 6 about half way down. Projecting upwardly from the arched or crank axle 16 is an arm 23 connected by rod 24 to latch lever 25 by means of which the crank axle may be swung to vary or adjust the height of the front end of the frame carrying the picking cylinders, to adapt the same to the crop being worked.

At the front of the main frame are sheet iron fenders or dividers 26 which are arranged one on each side and adapted to gather up limbs and leaning stalks, crowding them into a compact row preparatory to passing between the cylinders. These fenders are supported upon the front pointed ends of shoes 27 and are attached at their outer rear edges to the front ends of the side frames 6, the shoes being sesured at their outer edges to the lower edges of said side frames, by angle brackets or otherwise.

The picking cylinders rotate upon fixed vertical axles 28 which are set at their upper ends in clamps 29 on the cross piece 8 and at their lower ends secured in the shoes 27, thereby assisting in supporting said shoes. The axles of the picking cylinders are set respectively on opposite sides of the cross piece 8, throwing the cylinders slightly out of line so that the spindles of one cylinder will not contact or interfere with those of the other. The rotary doffing brushes 30 are set directly behind the cylinders to clear the cotton therefrom, being mounted on shaft 31 which find bearings at their upper end in a cross piece 32 and at their lower ends in boxes 33 on the shoes. The cylinder and brush on each side are driven from the main axle 13 by similar gearing, consisting in each instance of a sprocket 34 on said axle connected by chain 35 to sprocket 36 on a cross countershaft 37 which has a bevel gear 38 meshing with a similar gear 39 on one end of a shaft 40 which has at its other end a bevel gear 41 meshing with a large gear 42 forming the head of the cylinder, and another gear 43 meshing with a bevel pinion 44 on the upper end of the brush shaft 31. The speed of the doffing brush is several times that of the cylinder and it clears in the same direction as the movement of the cylinder. The various shafts are carried in bearings on suitable bars of the frame.

Each doffing brush delivers the cotton gathered thereby from the cylinder to an elevator for conveying the cotton to a bag placed on the platform 11 to receive it. Each elevator has a trough-shaped casing 45 leading upwardly and backwardly from the rear end of the shoe 27, and said casing has at its lower or front end a hopper or shield 46 which is open on the front side, toward the brush 31 and properly shaped to receive the cotton which is dropped or thrown from the brush. At the upper end of the casing is a spout 47 through which the cotton is dropped into a bag 48 below. Within the elevator casing is a pair of flat endless belts, of canvas or the like, which run in contact and between which the cotton is carried. The upper belt 49 runs over rollers 50 and 51 at the opposite ends of the casing, and the lower belt 52 runs over rollers 53 and 54 at its opposite ends, and also over a guide roller 55 which produces a horizontal foot run at 56 in the bottom of the hopper 46, so that cotton falling therein drops on said foot and is carried up between the belts. The elevators are driven by similar gearing consisting in each instance of a sprocket 57 on shaft 37, chain 58 to a sprocket 59 on the roller 51 which also has a gear 60 meshing with gear 61 on roller 54, thereby driving both belts.

The construction of the picking cylinders will be particularly apparent from Figs. 4, 5 and 6. Each cylinder is built up of a series of vertical plates 62 standing side by side to form a circle and having ends offset inwardly and bolted as at 63 to the cylinder head 42, in connection with inner plates 64 which stand behind or within the plates 62 and are secured thereto by bolts 65 having sleeves 66 to space said plates apart. Each plate carries a row of spindles 67 projecting radially therefrom, the outer portions being squared and twisted and having teeth 68 struck up to form points on which the cotton fiber will catch as the spindles pass through the plants. The spindles find bearings in the plates 62 and 64 and are driven by gears 69 thereon, between the plates, which gears mesh with each other along the whole row.

As stated, the head 42 is loose on the shaft 28. Keyed to this shaft, at or about the middle thereof, is a gear wheel 70 with teeth on both sides of its rim which mesh with gears 71 loose on one of the spindles 67 of each row, such spindle being lengthened or extended inwardly for the purpose, and each gear 71 has a clutch tooth 72 to engage in a notch 73 in a clutch wheel 74 on a squared part of the spindle. A spring 75 is coiled around the spindle and connected at one end to the extreme inner end thereof, and at the other end to a pin 76 projecting from the plate 64. The wheel 70 has on its upper and lower faces segmental ribs 77, which, as the cylinder revolves, act as wedges to throw out the clutches by moving the clutch wheels 74 inwardly on the squared part of the spindles. The clutches are normally engaged by the pressure of the springs 75, and the ribs 77 are located on the side of the wheel toward the row of plants. As the cylinder revolves, the gears rotate the spindles slowly and wind up the springs 75, the clutches being in engagement until the ribs 77 are reached, which occurs just as the spindles reach the plants. The ribs then throw out the clutches, and the springs immediately unwind, causing a rapid reverse rotation of the spindles which instantly catch and wind thereon all cotton in contact therewith. The spindles, after the springs are unwound, do not turn until the clutch wheels pass off the ribs and engage again, which starts again the winding of the springs and also by the reverse motion unwinds the cotton so that it is readily cleared off by the doffing brushes and delivered to the elevators as above described. In consequence of the comparatively large size of the gears 71 they are placed, on alternate rows, above and below the wheel 70.

The large number of spindles provided by the construction described searches every part of the plants which pass between the cylinders, but the spindles will not take hold of the unripe bolls, which are consequently left to ripen for subsequent operations.

We claim

1. In a cotton picking machine, a revolving picking cylinder comprising a head, plates secured thereto and standing upright in a circle, an axle on which the cylinder turns, a gear wheel fixed to the axle, a row of projecting spindles carried in bearings in the plates, the spindles of each row being geared to each other, a spring connected to one of the spindles whereby to rotate said spindle in one direction, a pinion connected with said spindle and meshing with said gear wheel, a clutch operatively connected between the pinion and the spindle, and means carried by the gear wheel to throw the clutch out of engagement during a part of each revolution of the cylinder.

2. In a cotton picking machine, a revolving picking cylinder comprising an upright hollow circular structure, a series of rows of spindles carried by said structure and extending outwardly therefrom, the spindles of each row being geared together, an axle on which said structure turns, a horizontal gear wheel fixed to the axle within the structure, a pinion loosely mounted on a spindle in each row and meshing with the gear wheel, a clutch for connecting the pinion with the spindle, a spring connected with said spindle for rotating said spindle in an opposite direction to its direction of rotation by the gear wheel and means to disengage the clutch during a certain part of each revolution of the cylinder.

3. In a cotton picking machine, a picking device comprising an upright axle, a cylinder head rotatable thereon, a plurality of spaced plates depending from the head and forming two concentric cylinders thereunder, a plurality of rows of spindles mounted to turn in the plates and projecting radially therefrom, intermeshing gears on the spindles of each row, between the plates, and means actuated by the revolution of the cylinder to rotate each spindle in one direction during a portion of said revolution and in the reverse direction during the remainder thereof.

4. In a cotton picking machine, a revolving picking cylinder having a plurality of projecting spindles, a gear wheel for rotating the spindles in one direction, springs for rotating the spindles in the opposite direction, and means for connecting and disconnecting the gear to the spindles.

5. In a cotton picking machine, a revolving picking cylinder having a plurality of projecting spindles, a pinion loosely journaled on each spindle, a gear wheel engaging all the pinions, means for connecting and disconnecting the pinions with their respective spindles, whereby to rotate said spindles in one direction, and springs for rotating the spindles in the opposite direction.

ALFRED B. AMES.
       HENRY SCHWENDENER.

Witnesses to A. B. Ames's signature:
 ANNA SUITER,
 E. A. SMITH.
Witnesses to Henry Schwendener's signature:
 B. WILEY,
 A. W. SUNDERLAND.